United States Patent
Tsou et al.

(10) Patent No.: US 10,361,635 B2
(45) Date of Patent: *Jul. 23, 2019

(54) METHOD OF CONTROLLING A POWER CONVERTER SWITCHED BY A ZERO CROSSING SIGNAL AND A CONTINUOUS CONDUCTION SIGNAL

(71) Applicant: Leadtrend Technology Corp., Hsinchu County (TW)

(72) Inventors: Ming-Chang Tsou, Hsinchu County (TW); Chih-Chi Chang, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,863

(22) Filed: Jul. 16, 2018

(65) Prior Publication Data

US 2018/0323718 A1   Nov. 8, 2018

Related U.S. Application Data

(63) Continuation of application No. 15/397,746, filed on Jan. 4, 2017, now Pat. No. 10,186,973.

(60) Provisional application No. 62/276,187, filed on Jan. 7, 2016.

(51) Int. Cl.
*H02M 3/335* (2006.01)
*H02M 1/00* (2006.01)

(52) U.S. Cl.
CPC ... *H02M 3/33523* (2013.01); *H02M 3/33507* (2013.01); *H02M 2001/0032* (2013.01); *H02M 2001/0058* (2013.01); *Y02B 70/1433* (2013.01); *Y02B 70/1491* (2013.01); *Y02B 70/16* (2013.01)

(58) Field of Classification Search
CPC ................ H02M 3/335–42; H02M 2001/0083
See application file for complete search history.

(56) References Cited

U.S. PATENT DOCUMENTS

2010/0157631 A1   6/2010   Lim
2014/0159686 A1   6/2014   Lee

OTHER PUBLICATIONS

Leadtrend, LD7830 "High Power Factor Flyback LED Controller with HV Start-up", Leadtrend Technology Corporation, Aug. 2012. pp. 1-18.

*Primary Examiner* — Gary L Laxton
*Assistant Examiner* — Peter M Novak
(74) *Attorney, Agent, or Firm* — Winston Hsu

(57) ABSTRACT

A multi-mode controller applied to a power converter includes a detection range generation module and a gate signal generation unit. The detection range generation module is used for generating a comparison voltage according to a reference current, and generating a detection signal according to the comparison voltage and a first reference voltage. When the detection signal is disabled by a zero-crossing signal, the gate signal generation unit generates a gate control signal corresponding to a quasi-resonant mode of the power converter according to the zero-crossing signal; and when the detection signal is disabled by a continuous-conduction mode signal generated by the detection range generation module according to the comparison voltage and a second reference voltage, the gate signal generation unit generates the gate control signal corresponding to a continuous-conduction mode of the power converter according to the continuous-conduction mode signal.

1 Claim, 4 Drawing Sheets

METHOD OF CONTROLLING A POWER CONVERTER SWITCHED BY A ZERO CROSSING SIGNAL AND A CONTINUOUS CONDUCTION SIGNAL

CROSS REFERENCE TO RELATED APPLICATIONS

This is a continuation application of U.S. patent application Ser. No. 15/397,746, filed on Jan. 4, 2017, which claims the benefit of U.S. Provisional Application No. 62/276,187, filed on Jan. 7, 2016. The above mentioned applications are included in their entirety herein by reference.

BACKGROUND OF THE INVENTION

1. Field of the Invention

The present invention relates to an operation method of a multi-mode controller applied to a power converter, and particularly to an operation method that can control a power converter to switch between a quasi-resonant mode and a continuous-conduction mode through a soft-switching method.

2. Description of the Prior Art

When a load coupled to a secondary side of a power converter is changed, a controller applied to the power converter can control the power converter to switch between a quasi-resonant mode and a continuous-conduction mode, wherein the controller controls the power converter to switch between the quasi-resonant mode and the continuous-conduction mode according to a compensation voltage through a hard-switching method, and the compensation voltage corresponds to the load coupled to the secondary side of the power converter. However, because the controller utilizes the hard-switching method to make the power converter switch between the quasi-resonant mode and the continuous-conduction mode, the hard-switching method may make an operation frequency of the power converter be significantly changed, resulting in the power converter having greater switching loss and noise, and generating audio.

SUMMARY OF THE INVENTION

An embodiment of the present invention provides an operation method of a multi-mode controller applied to a power converter, wherein the multi-mode controller includes a detection range generation module and a gate signal generation unit, and the detection range generation module comprises a current source, a capacitor, a metal-oxide-semiconductor transistor, a first comparison unit, a second comparison unit, and a logic unit. The operation method includes the current source providing a reference current; the capacitor generating a comparison voltage according to the reference current; the first comparison unit generating a detection signal according to the comparison voltage and a first reference voltage; the second comparison unit generating a continuous-conduction mode signal according to the comparison voltage and a second reference voltage; the logic unit turning on the metal-oxide-semiconductor transistor to disable the detection signal according to the continuous-conduction mode signal or a zero-crossing signal; the gate signal generation unit generating a gate control signal corresponding to a quasi-resonant mode of the power converter according to the zero-crossing signal when the detection signal is disabled by the zero-crossing signal; and the gate signal generation unit generating the gate control signal corresponding to the continuous-conduction mode of the power converter according to the continuous-conduction mode signal when the detection signal is disabled by the continuous-conduction mode signal according to the comparison voltage and the second reference voltage.

The present invention provides an operation method thereof. The operation method utilizes a detection range generation module to generate a detection signal, and utilizes a gate signal generation unit to generate a gate control signal corresponding to a quasi-resonant mode of the power converter according to a zero-crossing signal when the detection signal is disabled by the zero-crossing signal generated by a zero-crossing signal generation unit, or utilizes the gate signal generation unit to generate the gate control signal corresponding to a continuous-conduction mode of the power converter according to a continuous-conduction mode signal when the detection signal is disabled by the continuous-conduction mode signal generated by the detection range generation module. Therefore, compared to the prior art, because the present invention controls the power converter to switch between the quasi-resonant mode and the continuous-conduction mode through a soft-switching method, the present invention has lower switching loss and less noise, and can prevent from generating audio.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
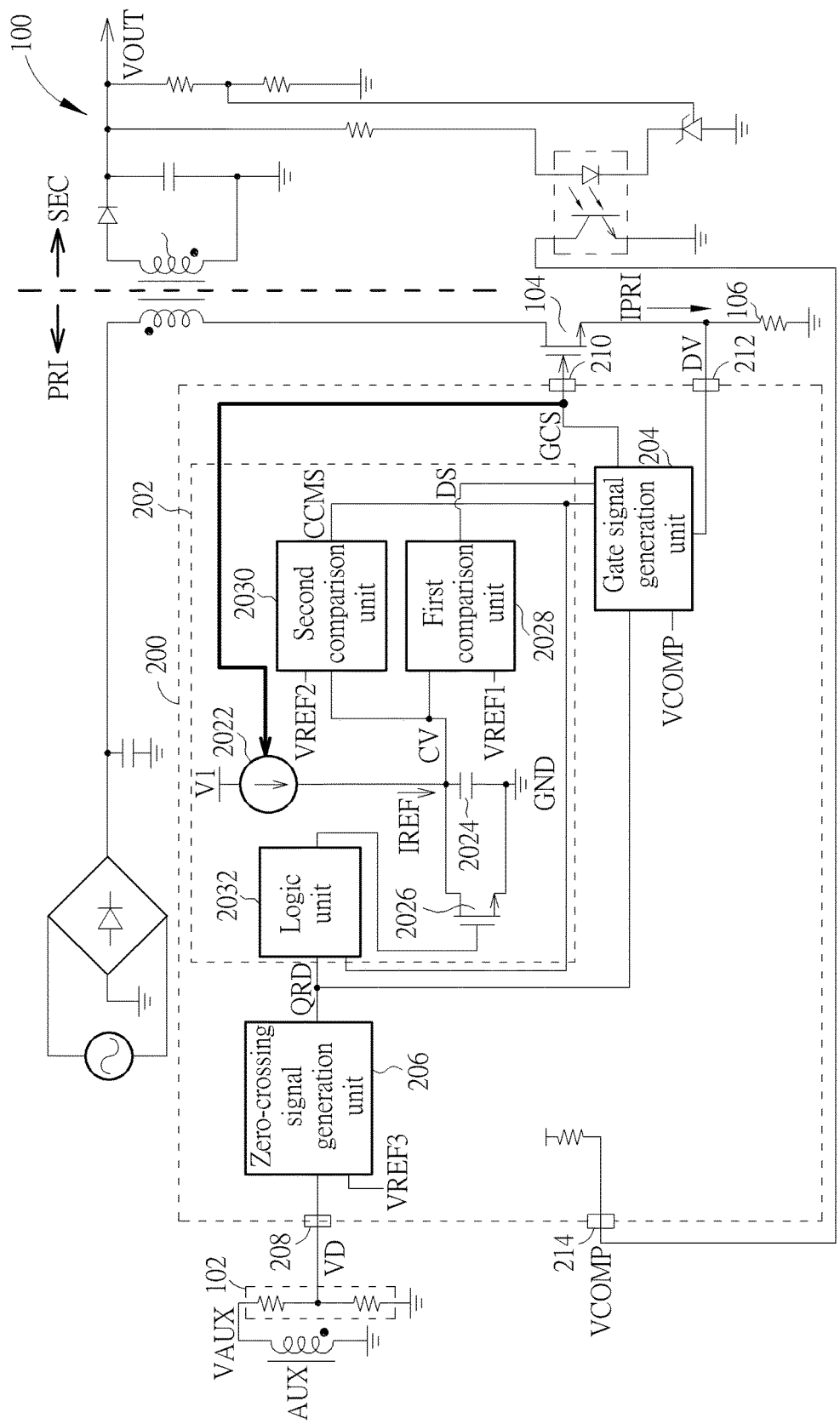
FIG. 1 is a diagram illustrating a multi-mode controller applied to a power converter 100 according to a first embodiment of the present invention.

Please refer to FIG. 1. FIG. 1 is a diagram illustrating a multi-mode controller 200 applied to a power converter 100 according to a first embodiment of the present invention, wherein the multi-mode controller 200 includes a detection range generation module 202, a gate signal generation unit 204, and a zero-crossing signal generation unit 206. As shown in FIG. 1, the detection range generation module 202 includes a current source 2022, a capacitor 2024, a metal-oxide-semiconductor transistor 2026, a first comparison unit 2028, a second comparison unit 2030, and a logic unit 2032. As shown in FIG. 1, the current source 2022 has a first terminal and a second terminal, wherein the first terminal of the current source 2022 is used for receiving a first voltage V1, the current source 2022 is used for providing a reference current IREF, and the reference current IREF is changed with an operation frequency of the power converter 100. The capacitor 2024 has a first terminal and a second terminal, wherein the first terminal of the capacitor 2024 is coupled to the second terminal of the current source 2022, the second terminal of the capacitor 2024 is coupled to ground GND, and the capacitor 2024 is used for generating a comparison voltage CV according to the reference current IREF. The metal-oxide-semiconductor transistor 2026 has a first terminal, a second terminal, and a third terminal, wherein the first terminal of the metal-oxide-semiconductor transistor 2026 is coupled to the first terminal of the capacitor 2024, the second terminal of the metal-oxide-semiconductor transistor 2026 is coupled to the ground GND, and the metal-oxide-semiconductor transistor 2026 is an N-type metal-oxide-semiconductor transistor. But, in another embodiment of the present invention, the metal-oxide-semiconductor transistor 2026 can also be a P-type metal-oxide-semiconductor transistor or a transmission gate. The first comparison unit 2028 has a first input terminal, a second input terminal, and an output terminal, wherein the first input terminal of the first comparison unit 2028 is coupled to the first terminal of the capacitor 2024 for receiving the comparison voltage CV, the second input terminal of the first comparison unit 2028 is used for receiving a first reference voltage VREF1, and the first comparison unit 2028 is used for generating a detection signal DS according to the comparison voltage CV and the first reference voltage VREF1. The second comparison unit 2030 has a first input terminal, a second input terminal, and an output terminal, wherein the first input terminal of the second comparison unit 2030 is coupled to the first terminal of the capacitor 2024 for receiving the comparison voltage CV, the second input terminal of the second comparison unit 2030 is used for receiving a second reference voltage VREF2, and the second comparison unit 2030 is used for generating a continuous-conduction mode signal CCMS according to the comparison voltage CV and the second reference voltage VREF2, wherein the second reference voltage VREF2 is greater than the first reference voltage VREF1. The logic unit 2032 has a first input terminal, a second input terminal, and an output terminal, wherein the first input terminal of the logic unit 2032 is coupled to the zero-crossing signal generation unit 206 for receiving a zero-crossing signal QRD, the second input terminal of the logic unit 2032 is coupled to the output terminal of the second comparison unit 2030 for receiving the continuous-conduction mode signal CCMS, and the logic unit 2032 is used for turning on the metal-oxide-semiconductor transistor 2026 to disable the detection signal DS according to the zero-crossing signal QRD or the continuous-conduction mode signal CCMS.

Figure 2:
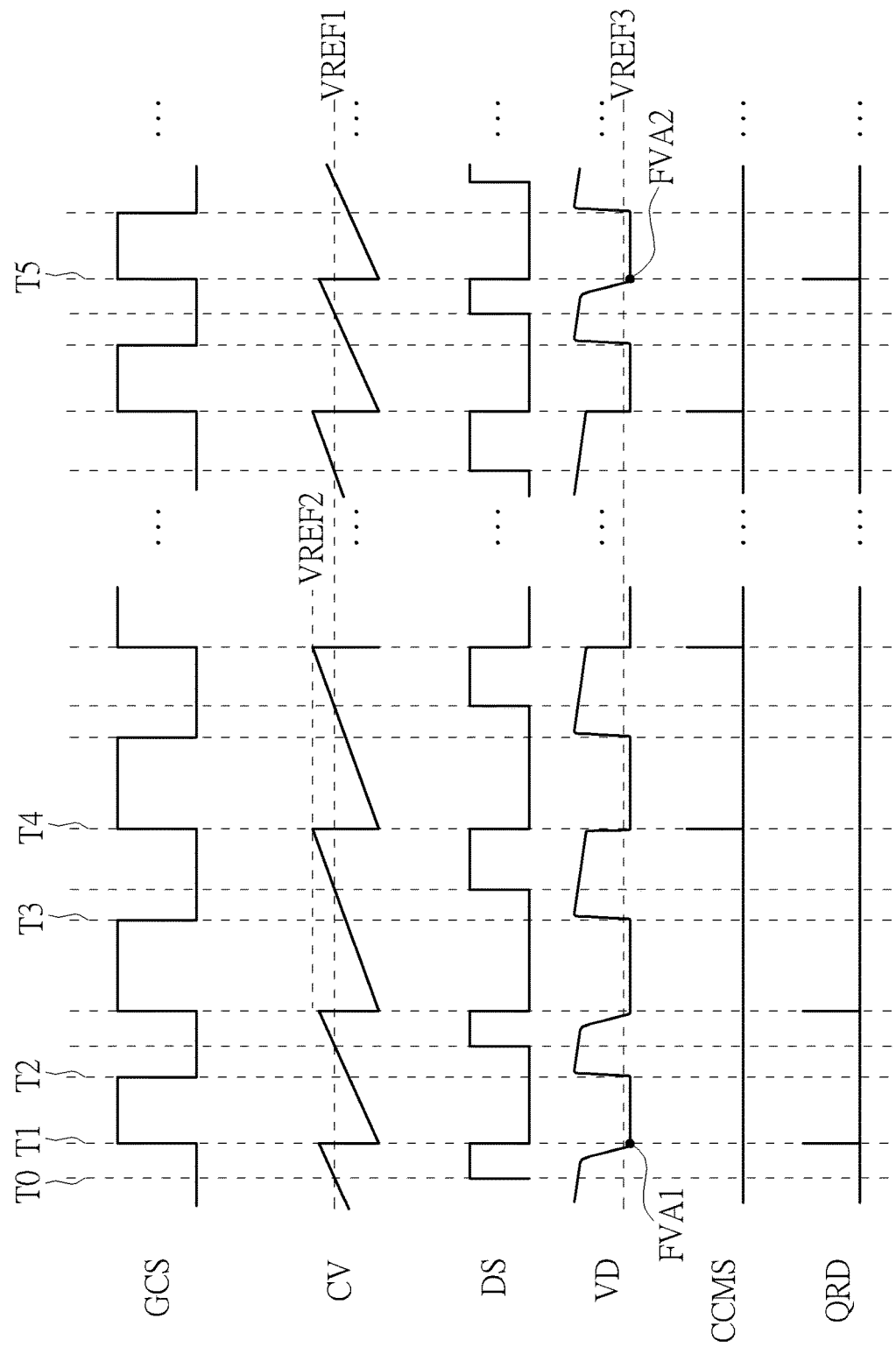
FIG. 2 is a timing diagram illustrating a gate control signal, a comparison voltage, a detection signal, a voltage, a continuous-conduction mode signal, and a zero-crossing signal.
Figure 3:
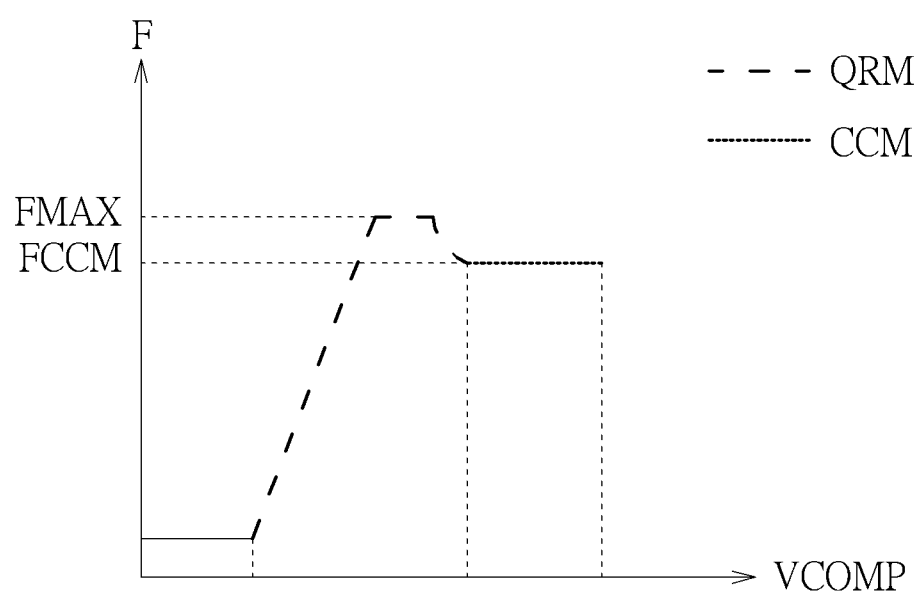
FIG. 3 is a diagram illustrating a relationship between a frequency of the gate control signal and a compensation voltage.

During the power converter 100 operating in a quasi-resonant mode (QRM), when a load (not shown in FIG. 1) coupled to a secondary side SEC of the power converter 100 is light or medium, the zero-crossing signal generation unit 206 generates the zero-crossing signal QRD at non-first valleys of a voltage VD (e.g. a second valley, a third valley of the voltage VD, and so on, wherein the second valley and the third valley of the voltage VD are not shown in FIG. 2) according to the voltage VD and a third reference voltage VREF3, wherein the zero-crossing signal generation unit 206 receives the voltage VD through an auxiliary pin 208 of the multi-mode controller 200 from a voltage divider 102 coupled to an auxiliary winding AUX of a primary side PRI of the power converter 100, the voltage VD corresponds to an auxiliary voltage VAUX of the auxiliary winding AUX, and the auxiliary voltage VAUX corresponds to an output voltage VOUT of the secondary side SEC of the power converter 100. As shown in FIG. 2, before a time T0, the comparison voltage CV generated by the capacitor 2024 is increased gradually. At the time T0, when the comparison voltage CV is greater than the first reference voltage VREF1, the first comparison unit 2028 enables the detection signal DS, wherein the first reference voltage VREF1 corresponds to a maximum operation frequency FMAX of the power converter 100 corresponding to the quasi-resonant mode of the power converter 100. At a time T1, because the load coupled to the secondary side SEC of the power converter 100 is changed to heavy, the zero-crossing signal generation unit 206 can generate the zero-crossing signal QRD at a first valley FVA1 of the voltage VD (because a frequency F (that is, the operation frequency of the power converter 100) of a gate control signal GCS of the power converter 100 is increased with increase of the load coupled to the secondary side SEC of the power converter 100 in the quasi-resonant mode of the power converter 100) according to the voltage VD and the third reference voltage VREF3 (that is, at the first valley FVA1 of the voltage VD, the voltage VD can cross the third reference voltage VREF3, so the zero-crossing signal generation unit 206 generates the zero-crossing signal QRD accordingly). Meanwhile, the logic unit 2032 turns on the metal-oxide-semiconductor transistor 2026 to disable the detection signal DS according to the zero-crossing signal QRD, and the gate signal generation unit 204 generates the gate control signal GCS corresponding to the quasi-resonant mode of the power converter 100 according to the zero-crossing signal QRD. That is to say, when the detection signal DS is enabled, if the zero-crossing signal generation unit 206 generates the zero-crossing signal QRD, the gate signal generation unit 204 can generate the gate control signal GCS corresponding to the quasi-resonant mode of the power converter 100 according to the zero-crossing signal QRD, wherein meanwhile the frequency F (that is, the operation frequency of the power converter 100) of the gate control signal GCS is equal to the maximum operation frequency FMAX (as shown in FIG. 3) of the power converter 100 corresponding to the quasi-resonant mode of the power converter 100, and the multi-mode controller 200 can transmit the gate control signal GCS to a power switch 104 of the primary side PRI of the power converter 100 through a gate pin 210 to control turning-on and turning-off of the power switch 104. Therefore, because during the power converter 100 operating in the quasi-resonant mode, based on the load coupled to the secondary side SEC of the power converter 100, the zero-crossing signal generation unit 206 can generate the zero-crossing signal QRD according to different valleys of the voltage VD (e.g. the first valley, the second valley, the third valley of the voltage VD, and so on) and the third reference voltage VREF3, as shown in FIG. 3, when the power converter 100 operates in the quasi-resonant mode, the frequency F (that is, the operation frequency of the power converter 100) of the gate control signal GCS corresponding to the quasi-resonant mode of the power converter 100 is variable.

Between the time T1 and a time T2, because the power switch 104 is turned on, a detection voltage DV is increased gradually, wherein the detection voltage DV is determined by a current IPRI flowing through the power switch 104 and a resistor 106, and the gate signal generation unit 204 can receive the detection voltage DV through a current detection pin 212 of the multi-mode controller 200. At the time T2, the gate signal generation unit 204 can disable the gate control signal GCS according to the detection voltage DV and a compensation voltage VCOMP (that is, when the detection voltage DV is greater than the compensation voltage VCOMP, the gate signal generation unit 204 disables the gate control signal GCS), wherein the gate signal generation unit 204 can receive the compensation voltage VCOMP from the secondary side SEC of the power converter 100 through a compensation pin 214 of the multi-mode controller 200, and the compensation voltage VCOMP corresponds to the output voltage VOUT of the secondary side SEC of the power converter 100.

However, when the load coupled to the secondary side SEC of the power converter 100 is increased continuously, because an enabling time of the gate control signal GCS is also increased with increase of the load coupled to the secondary side SEC of the power converter 100, the voltage VD cannot be discharged to be lower than the third reference voltage VREF3 between a time T3 and a time T4 (that is, the zero-crossing signal generation unit 206 cannot generate the zero-crossing signal QRD according to the voltage VD and the third reference voltage VREF3). At the time T4, when the comparison voltage CV is greater than the second reference voltage VREF2, the second comparison unit 2030 generates the continuous-conduction mode signal CCMS, wherein the second reference voltage VREF2 corresponds to an operation frequency FCCM of the power converter 100 corresponding to a continuous-conduction mode (CCM) of the power converter 100. Meanwhile, the logic unit 2032 turns on the metal-oxide-semiconductor transistor 2026 to disable the detection signal DS according to the continuous-conduction mode signal CCMS, and the gate signal generation unit 204 generates the gate control signal GCS corresponding to the continuous-conduction mode of the power converter 100 according to the continuous-conduction mode signal CCMS. That is to say, when the detection signal DS is enabled, if the zero-crossing signal generation unit 206 does not generate the zero-crossing signal QRD, the gate signal generation unit 204 can generate the gate control signal GCS corresponding to the continuous-conduction mode of the power converter 100 according to the continuous-conduction mode signal CCMS, wherein the frequency F of the gate control signal GCS is equal to the operation frequency FCCM (as shown in FIG. 3) of the power converter 100 corresponding to the continuous-conduction mode of the power converter 100, wherein when the power converter 100 operates in the continuous-conduction mode, the frequency F of the gate control signal GCS corresponding to the continuous-conduction mode of the power converter 100 is fixed. Therefore, as shown in FIG. 3, after the time T4, the power converter 100 enters the continuous-conduction mode from the quasi-resonant mode.

In addition, as shown in FIG. 3, at a time T5, when the load coupled to the secondary side SEC of the power converter 100 is reduced gradually, because a discharge time of the voltage VD is reduced with decrease of the load coupled to the secondary side SEC of the power converter 100, the zero-crossing signal generation unit 206 can start to generate the zero-crossing signal QRD at a first valley FVA2 of the voltage VD (wherein the detection signal DS is still enabled before the time T5) according to the voltage VD and the third reference voltage VREF3. Meanwhile, the logic unit 2032 turns on the metal-oxide-semiconductor transistor 2026 to disable the detection signal DS according to the zero-crossing signal QRD, and the gate signal generation unit 204 generates the gate control signal GCS corresponding to the quasi-resonant mode of the power converter 100 according to the zero-crossing signal QRD, wherein the frequency F of the gate control signal GCS is equal to the maximum operation frequency FMAX (as shown in FIG. 3) of the power converter 100 corresponding to the quasi-resonant mode of the power converter 100. That is to say, after the time T5, the power converter 100 enters the quasi-resonant mode from the continuous-conduction mode.

In addition, as shown in FIG. 3, from the time T2 to the time T4, the multi-mode controller 200 smoothly controls the power converter 100 to switch from the quasi-resonant mode to the continuous-conduction mode, and from the time T4 to the time T5, the multi-mode controller 200 also smoothly controls the power converter 100 to switch from the continuous-conduction mode to the quasi-resonant mode. That is to say, between the time T2 and the time T4, the multi-mode controller 200 controls the power converter 100 to switch from the quasi-resonant mode to the continuous-conduction mode through a soft-switching method, and between the time T4 and the time T5, the multi-mode controller 200 also controls the power converter 100 to switch from the continuous-conduction mode to the quasi-resonant mode through the soft-switching method.

Figure 4:
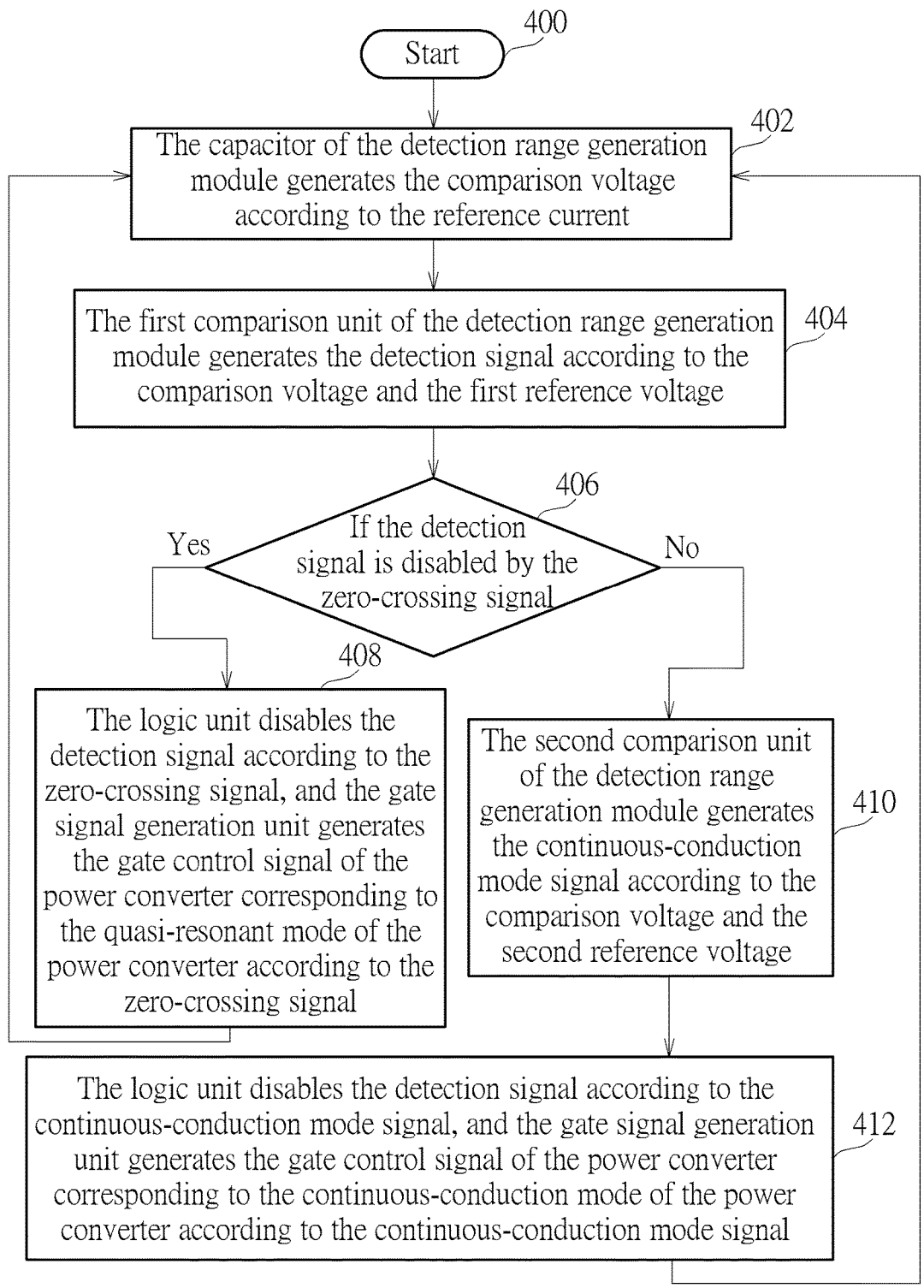
FIG. 4 is a flowchart illustrating an operation method of a multi-mode controller applied to a power converter according to a second embodiment of the present invention.

Please refer to FIGS. 1-4. FIG. 4 is a flowchart illustrating an operation method of a multi-mode controller applied to a power converter according to a second embodiment of the present invention. The operation method in FIG. 4 is illustrated using the power converter 100 and the multi-mode controller 200 in FIG. 1. Detailed steps are as follows:

Step 400: Start.

Step 402: The capacitor 2024 of the detection range generation module 202 generates the comparison voltage CV according to the reference current IREF.

Step 404: The first comparison unit 2028 of the detection range generation module 202 generates the detection signal DS according to the comparison voltage CV and the first reference voltage VREF1.

Step 406: If the detection signal DS is disabled by the zero-crossing signal QRD; if yes, go to Step 408; if no, go to Step 410.

Step 408: The logic unit 2032 disables the detection signal DS according to the zero-crossing signal QRD, and the gate signal generation unit 204 generates the gate control signal GCS of the power converter 100 corresponding to the quasi-resonant mode of the power converter 100 according to the zero-crossing signal QRD, go to Step 402.

Step 410: The second comparison unit 2030 of the detection range generation module 202 generates the continuous-conduction mode signal CCMS according to the comparison voltage CV and the second reference voltage VREF2.

Step 412: The logic unit 2032 disables the detection signal DS according to the continuous-conduction mode signal CCMS, and the gate signal generation unit 204 generates the gate control signal GCS of the power converter 100 corresponding to the continuous-conduction mode of the power converter 100 according to the continuous-conduction mode signal CCMS, go to Step 402.

In Step 402, as shown in FIG. 1, the capacitor 2024 can generate the comparison voltage CV according to the reference current IREF. In Step 404, as shown in FIG. 2, before the time T0, the comparison voltage CV generated by the capacitor 2024 is increased gradually. At the time T0, when the comparison voltage CV is greater than the first reference voltage VREF1, the first comparison unit 2028 enables the detection signal DS, wherein the first reference voltage VREF1 corresponds to the maximum operation frequency FMAX of the power converter 100 corresponding to the quasi-resonant mode of the power converter 100. In Step 408, as shown in FIG. 2, at the time T1, because the load coupled to the secondary side SEC of the power converter 100 is changed to heavy, the zero-crossing signal generation unit 206 can generate the zero-crossing signal QRD at the first valley FVA1 of the voltage VD (because the operation frequency of the power converter 100 corresponding to the quasi-resonant mode of the power converter 100 is increased with increase of the load coupled to the secondary side SEC of the power converter 100) according to the voltage VD and the third reference voltage VREF3 (that is, at the first valley FVA1 of the voltage VD, the voltage VD can cross the third reference voltage VREF3, so the zero-crossing signal generation unit 206 generates the zero-crossing signal QRD accordingly). Meanwhile, the logic unit 2032 turns on the metal-oxide-semiconductor transistor 2026 to disable the detection signal DS according to the zero-crossing signal QRD, and the gate signal generation unit 204 generates the gate control signal GCS corresponding to the quasi-resonant mode of the power converter 100 according to the zero-crossing signal QRD. That is to say, when the detection signal DS is enabled, if the zero-crossing signal generation unit 206 generates the zero-crossing signal QRD, the gate signal generation unit 204 can generate the gate control signal GCS corresponding to the quasi-resonant mode of the power converter 100 according to the zero-crossing signal QRD, wherein meanwhile the frequency F (that is, the operation frequency of the power converter 100) of the gate control signal GCS is to the maximum operation frequency FMAX (as shown in FIG. 3) of the power converter 100 corresponding to the quasi-resonant mode of the power converter 100.

Between the time T1 and the time T2, because the power switch 104 is turned on, the detection voltage DV is increased gradually, wherein the detection voltage DV is determined by the current IPRI flowing through the power switch 104 and the resistor 106, and the gate signal generation unit 204 can receive the detection voltage DV through the current detection pin 212 of the multi-mode controller 200. At the time T2, the gate signal generation unit 204 can disable the gate control signal GCS according to the detection voltage DV and the compensation voltage VCOMP, wherein the compensation voltage VCOMP corresponds to the output voltage VOUT of the secondary side SEC of the power converter 100.

As shown in FIG. 2, when the load coupled to the secondary side SEC of the power converter 100 is increased continuously, because the enabling time of the gate control signal GCS is also increased with increase of the load coupled to the secondary side SEC of the power converter 100, the voltage VD cannot be discharged to be lower than the third reference voltage VREF3 between the time T3 and the time T4 (that is, the zero-crossing signal generation unit 206 cannot generate the zero-crossing signal QRD according to the voltage VD and the third reference voltage VREF3). Therefore, in Step 410, at the time T4, when the comparison voltage CV is greater than the second reference voltage VREF2, the second comparison unit 2030 generates the continuous-conduction mode signal CCMS, wherein the second reference voltage VREF2 corresponds to the operation frequency FCCM of the power converter 100 corresponding to a continuous-conduction mode (CCM) of the power converter 100. Meanwhile, in Step 412, the logic unit 2032 turns on the metal-oxide-semiconductor transistor 2026 to disable the detection signal DS according to the continuous-conduction mode signal CCMS, and the gate signal generation unit 204 generates the gate control signal GCS corresponding to the continuous-conduction mode of the power converter 100 according to the continuous-conduction mode signal CCMS. That is to say, when the detection signal DS is enabled, if the zero-crossing signal generation unit 206 does not generate the zero-crossing signal QRD, the gate signal generation unit 204 can generate the gate control signal GCS corresponding to the continuous-conduction mode of the power converter 100 according to the continuous-conduction mode signal CCMS, wherein the frequency F of the gate control signal GCS is equal to the operation frequency FCCM (as shown in FIG. 3) of the power converter 100 corresponding to the continuous-conduction mode of the power converter 100. Therefore, as shown in FIG. 3, after the time T4, the power converter 100 enters the continuous-conduction mode from the quasi-resonant mode.

In addition, as shown in FIG. 3, at the time T5, when the load coupled to the secondary side SEC of the power converter 100 is reduced gradually, because the discharge time of the voltage VD is reduced with decrease of the load coupled to the secondary side SEC of the power converter 100, the zero-crossing signal generation unit 206 can start to generate the zero-crossing signal QRD at the first valley FVA2 of the voltage VD (wherein the detection signal DS is still enabled before the time T5) according to the voltage VD and the third reference voltage VREF3. Meanwhile, the logic unit 2032 turns on the metal-oxide-semiconductor transistor 2026 to disable the detection signal DS according to the zero-crossing signal QRD, and the gate signal generation unit 204 generates the gate control signal GCS corresponding to the quasi-resonant mode of the power converter 100 according to the zero-crossing signal QRD, wherein the frequency F of the gate control signal GCS is equal to the maximum operation frequency FMAX (as shown in FIG. 3) of the power converter 100 corresponding to the quasi-resonant mode of the power converter 100. That is to say, after the time T5, the power converter 100 enters the quasi-resonant mode from the continuous-conduction mode.

To sum up, the multi-mode controller applied to the power converter and the operation method thereof utilize the detection range generation module to generate the detection signal, and utilize the gate signal generation unit to generate the gate control signal corresponding to the quasi-resonant mode of the power converter according to the zero-crossing signal when the detection signal is disabled by the zero-crossing signal generated by the zero-crossing signal generation unit, or utilize the gate signal generation unit to generate the gate control signal corresponding to the continuous-conduction mode of the power converter according to the continuous-conduction mode signal when the detection signal is disabled by the continuous-conduction mode signal generated by the detection range generation module. Therefore, compared to the prior art, because the present invention controls the power converter to switch between the quasi-resonant mode and the continuous-conduction mode through the soft-switching method, the present invention has lower switching loss and less noise, and can prevent from generating audio.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An operation method of a multi-mode controller applied to a power converter, wherein the multi-mode controller comprises a detection range generation module and a gate signal generation unit, and the detection range generation module comprises a current source, a capacitor, a metal-oxide-semiconductor transistor, a first comparison unit, a second comparison unit, and a logic unit, the operation method comprising:
- the current source providing a reference current;
- the capacitor generating a comparison voltage according to the reference current;
- the first comparison unit generating a detection signal according to the comparison voltage and a first reference voltage;
- the second comparison unit generating a continuous-conduction mode signal according to the comparison voltage and a second reference voltage;
- the logic unit turning on the metal-oxide-semiconductor transistor to disable the detection signal according to the continuous-conduction mode signal or a zero-crossing signal;
- the gate signal generation unit generating a gate control signal corresponding to a quasi-resonant mode of the power converter according to the zero-crossing signal when the detection signal is disabled by the zero-crossing signal; and
- the gate signal generation unit generating the gate control signal corresponding to the continuous-conduction mode of the power converter according to the continuous-conduction mode signal when the detection signal is disabled by the continuous-conduction mode signal according to the comparison voltage and the second reference voltage.

* * * * *